United States Patent [19]
Ditto

[11] 4,076,780
[45] Feb. 28, 1978

[54] PROGRAMMABLE VELOCITY AND FORCE CONTROL METHOD FOR COMPRESSION MOLDING

[75] Inventor: Edwin D. Ditto, Bloomfield Hills, Mich.

[73] Assignee: General Motors Corporation, Detroit, Mich.

[21] Appl. No.: 762,852

[22] Filed: Jan. 27, 1977

[51] Int. Cl.² .................................................. B29G 1/00
[52] U.S. Cl. ...................................... 264/40.5; 264/294; 264/325
[58] Field of Search ............... 264/40.5, 325; 425/214, 425/408

[56] References Cited

U.S. PATENT DOCUMENTS

| | | | |
|---|---|---|---|
| 3,401,425 | 9/1968 | Fink | 264/40.5 X |
| 3,531,830 | 10/1970 | Gelin | 264/325 X |
| 3,543,344 | 12/1970 | Hunt | 264/325 X |
| 3,667,891 | 6/1972 | Gelin | 425/408 |
| 3,694,541 | 9/1972 | Gelin | 264/325 X |
| 3,802,818 | 4/1974 | Watanabe | 425/78 |
| 3,809,739 | 5/1974 | Gelin | 264/325 X |
| 3,819,774 | 6/1974 | Eggenberger | 264/40.5 X |

*Primary Examiner*—Richard R. Kucia
*Attorney, Agent, or Firm*—Warren D. Hill

[57] ABSTRACT

A compression molding operation is controlled by applying a press force to a mold having a cavity charged with molding compound. The separation of the mold halves is measured at each corner thereof by linear variable differential transformers. Hydraulic cylinders operating on the press ram generally in the area of each corner of the molds are individually controlled to locally vary the press force on the molds to maintain mold parallelism as determined by the LVDT's to control the velocity of press closing also as measured by the LVDT's according to a preprogrammed velocity profile, and further to control the amount of press force applied to the molds according to a preprogrammed value during curing of the molding compound.

8 Claims, 8 Drawing Figures

PROGRAMMABLE VELOCITY AND FORCE CONTROL METHOD FOR COMPRESSION MOLDING

This invention relates to a method of programmably controlling a compression molding process according to a program establishing desired velocity and force values.

Previously large compression molding presses have been characterized by pressing speeds which are adjustable but constant during any given phase of operation which has the effect of causing an ever increasing material velocity in the cavity during cavity fill since the charge is decreasing in thickness and increasing in area with each increment of press closure. This material acceleration reaches a maximum at the shear edge. The result of this increasing material velocity is: (1) turbulent flow that traps air in the molded part, (2) undesirable orientation and breakage of reinforcement fibers, (3) excessive flashing due to resin and fiber separation and (4) laminations or knit lines due to resin and fiber separation.

The previously known presses also exhibit a lack of parallelism between upper and lower mold halves during closing due to eccentric forces against the ram face of the press. These eccentric forces are caused by the product design, mold design, charge placement, material flow pattern, mold placement in the press and frictional forces in the press and tooling. Regardless of the type of press guidance system in use, none can effectively resist the vertical eccentric forces caused by the above conditions. The lack of parallelism between mold halves while pressing results in loss of control of material velocity in the cavity during cavity fill and undesireable material reflow due to the rate of change of mold tilt. When the cavity is near full, the lack of parallelism results in tapered wall sections in parts where some mold stops contact and others do not. When stops contact sequentially, material reflow occurs within the cavity and generates waves and other surface irregularities in the molded part. Also heat transferability between the mold surface and the molding compound is adversely affected due to the changing tilt. The lack of parallelism during press opening can cause excessive binding within the shear edge area on the mold which results in excessive mold wear and cracked molded parts.

Previously, molding presses have been limited to a fixed rapid increase of press force on the part during the curing cycle which tended to result in molding compound squirting out of the mold if the press force becomes too great at a given stage of cure or, on the other hand, failing to apply necessary force to maintain good thermal contact between the heated mold and the molding compound.

The general object of the invention therefore is to provide a method of compression molding which maintains mold parallelism and programmably and variably controls the velocity of mold closing and the press force application.

It is a further object to provide such a method which also maintains mold parallelism during mold opening.

Another object is to provide such a method utilizing conventional compression molding presses or mechanical stamping presses.

The invention is carried out by providing in a compression molding press a plurality of transducers for measuring the mold spacing at various locations around the mold and in response to such measurements controlling the distribution of press forces applied to the mold to maintain mold parallelism and also to control the velocity of mold closing according to a preset program and sensing variable forces applied to the molds during the cure cycle and in response thereto controlling the forces applied to the mold according to a programmed schedule.

The above and other advantages will be made more apparent from the following specification taken in conjunction with the accompanying drawings wherein like reference numerals refer to like parts and wherein.

Figure 1:
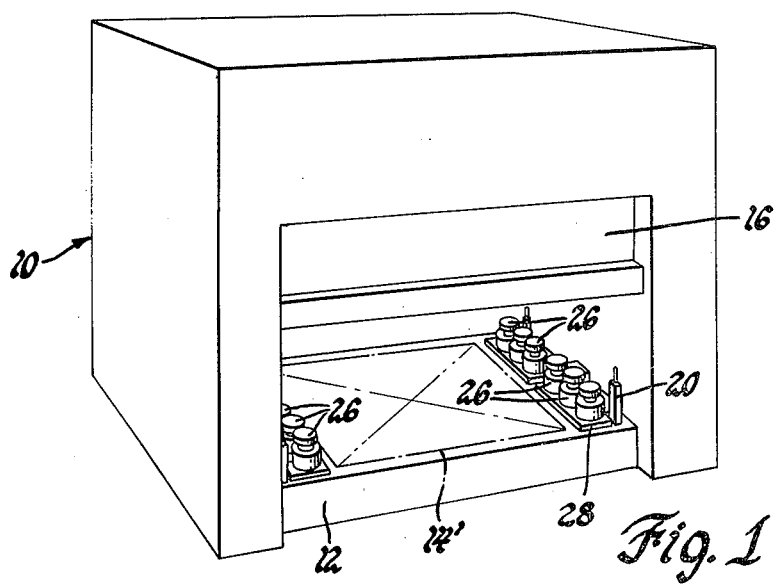
FIG. 1 is a perspective view of the molding press adapted to carry out the method of this invention.
Figure 2:
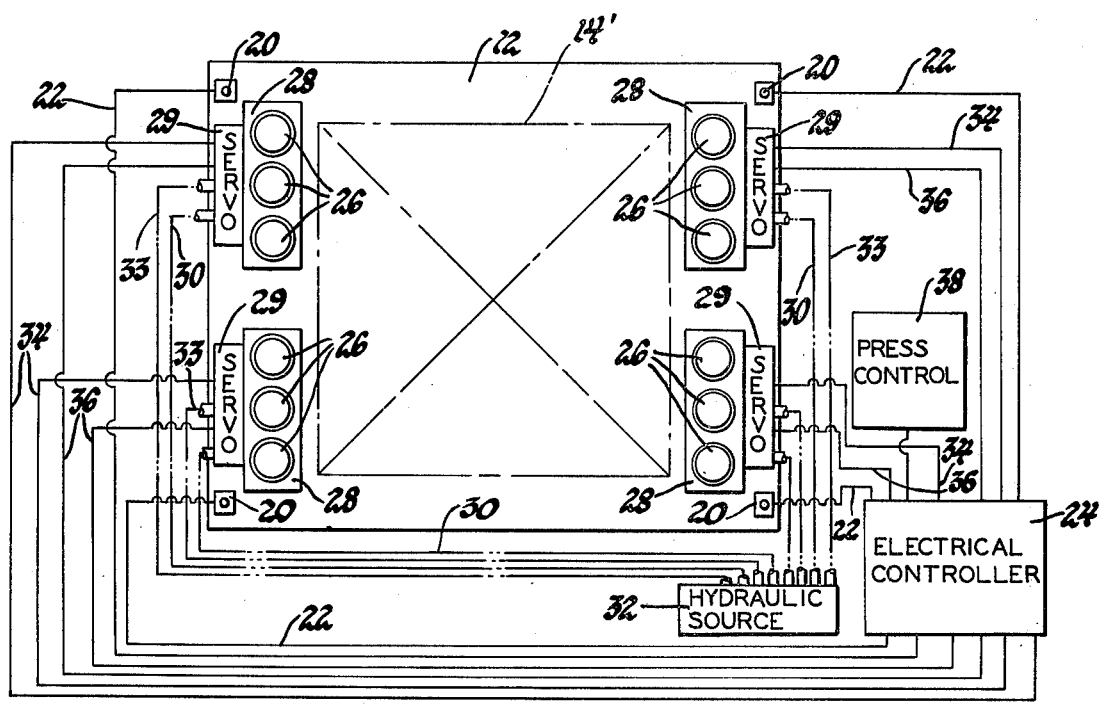
FIG. 2 is a diagrammatic illustration of a system for carrying out the subject method including a plan view of the bolster of the press of FIG. 1.
Figure 3:
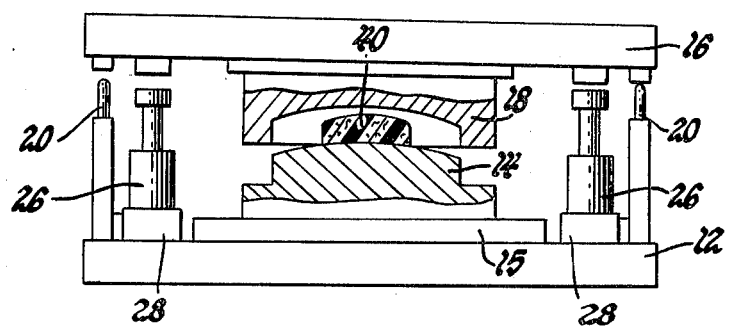
FIG. 3 is a diagrammatic elevation of a portion of a press including molds illustrating one step in the method of the invention.

Referring to the drawings, FIGS. 1, 2 and 3 show a hydraulic molding press modified to practice the method of this invention. The press 10 includes a bolster 12 for supporting a lower mold half 14, and a heating plate 15 between the bolster and mold half 14 supplies heat to the lower mold half 14. In FIGS. 1 and 2, the area on the bolster occupied by the mold half 14 and heat plate 15 is indicated in broken lines 14'. A press ram 16 is provided for supporting an upper mold half 18. At each corner of the bolster, a linear variable differential transformer (LVDT) 20 is supported and arranged to contact the upper ram as it is moved toward a mold closed position. While the ram may have a relatively large travel, it is necessary for the LVDT's 20 to be in contact with the ram 16 only during approximately the last inch of mold closing since the subject control method operates only during that range. Electrical signals from the LVDT's 20 are transmitted by lines 22 to an electrical controller 24. Four groups of hydraulic cylinders 26, three cylinders per group, are mounted adjacent each corner of the molds such that a group of cylinders 26 corresponds in general location to each LVDT 20.

Each cylinder group is supplied by a common manifold 28 which is connected through a servo controlled hydraulic valve 29 and hydraulic line 30 to a hydraulic pressure source 32 which provides hydraulic fluid under pressure. A hydraulic return line 33 extends from the servo valve 29 to the source 32. Each servo valve 29 is controlled to deliver a desired output to the manifold 28 by the electrical controller 24 via signal line 34. A pressure transducer, not shown, associated with each manifold measures its respective manifold pressure and electrically provides that information via line 36 to the electrical controller 24. Thus, in effect, the cylinders of each group 26 are operated together at the same force but each group of cylinders is controlled independently of the others by the controller 24 in response to the position and pressure signals on lines 22 and 36 and the preset program in the controller. The main press force on the molds is applied by the ram 16 but is in part resisted by the groups of cylinders 26. The result is that the ram force acting on the mold is controlled by the cylinders 26 to establish the net force and its general distribution over the mold.

As shown in FIG. 3, a mass of molding compound 40 is placed in the mold cavity in preparation for forming into an article of desired shape and surface quality. The molding compound, as is commonly used in compression molding processes, is a thickened resin, preimpregnated with reinforcing fibers with the resin ordinarily being a thermosetting material. Typically, the molding compound comprises 30 to 35% polyester resin, up to 40% filler, e.g., calcium carbonate, and 30 to 65% glass fiber.

Figure 6:
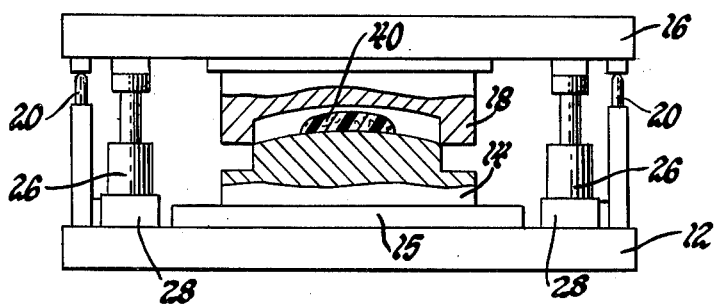
FIGS. 6 and 7 are diagrammatic views of the apparatus of FIG. 3 illustrating subsequent steps in the practice of the method of the invention.

The electrical controller 24 includes a microprocessor which is programmed in a conventional manner to carry out the steps of the subject method of control. In particular, as shown in FIG. 3, in which the ram 16 is being lowered and just coming into contact with the LVDT's 20 and the cylinders 26, the ram is cocked or tilted so that molds 14 and 18 are out of parallel. This condition is detected by the controller 24 which senses the discrepancies in the LVDT signals. The signals from each LVDT 20 is a direct function of the mold separation as measured at the corner of the press at which that particular LVDT is located. The controller then calculates the corrective action required to establish the desired tilt relationship of the molds (parallelism) and individually controls the pressure via the servo valves to the respective groups of cylinders 26 to resist the main ram force by an amount necessary to correct the imbalance and achieve parallelism as shown in FIG. 6. Then throughout the remainder of the molding operation and reopening of the press, parallelism is maintained by constant monitoring of the several LVDT signals by the controller 24 and resultant adjustments of hydraulic pressure of the cylinders 26. Thus in effect, the ram force as it affects the mold halves 16 and 18 is selectively resisted to compensate for forces arising within the mold which may tend to cause tilting.

As the press continues its closing motion, the molding compound is forced to flow in a controlled manner throughout the mold cavity. After the press ram is rendered parallel, the controller 24 switches the system into preprogrammable velocity control, the velocity being determined from changes in the LVDT signals. The controlled final inch of mold closure is divided into 16 increments each of which is programmed for a desired velocity by manual insertion of a desired velocity for each increment through the press control 38.

Figure 4:
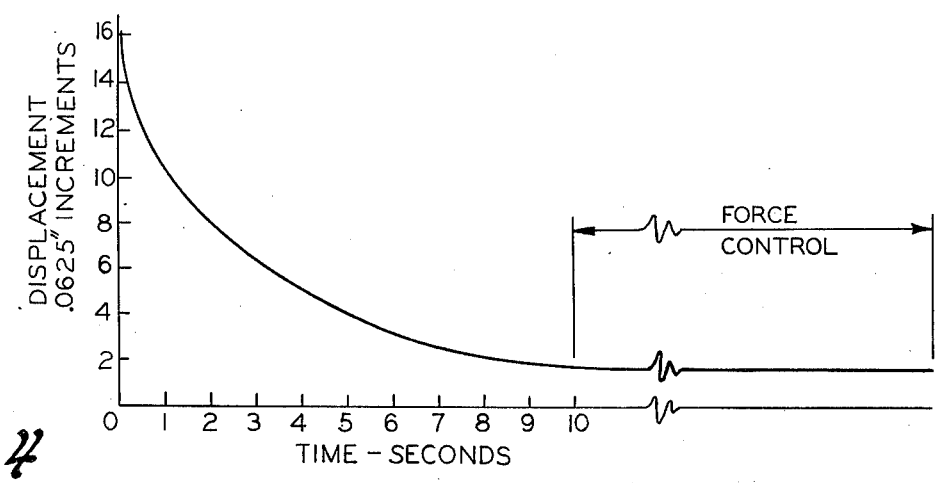
FIG. 4 is a displacement versus time diagram illustrating typical velocity control available by practice of the method.
Figure 7:
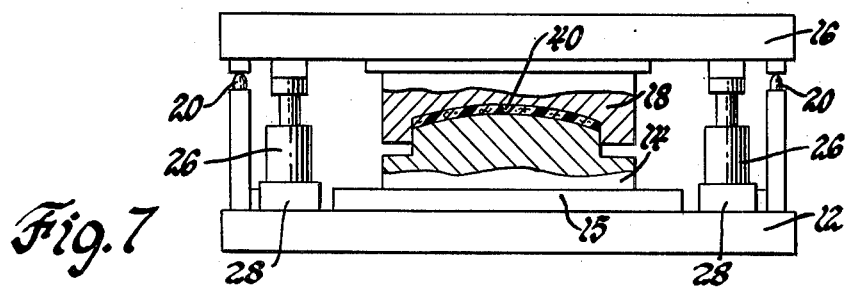

FIG. 4 illustrates a typical velocity profile showing the displacement increments versus time. In general the closing velocity of the mold (the slope of the curve in FIG. 4) decreases over a selected closing period such as 10 seconds and reaches zero velocity when the desired part thickness is attained. This decreasing velocity of the ram allows the molding compound to flow more or less uniformly through the cavity even though the vertical cavity dimensions are progressively decreasing. Thus the preferred velocity profile for any given mold can be empirically determined and programmed into the controller 24. For a given part, the optimum rate of closure can be selected for each increment of closure. When the desired part thickness is reached, as shown in FIG. 7, a dwell or hold period at that thickness is programmed to allow the molding material to solidify or cure sufficiently to resist the force buildup that is applied when the dwell ends.

Figure 5:
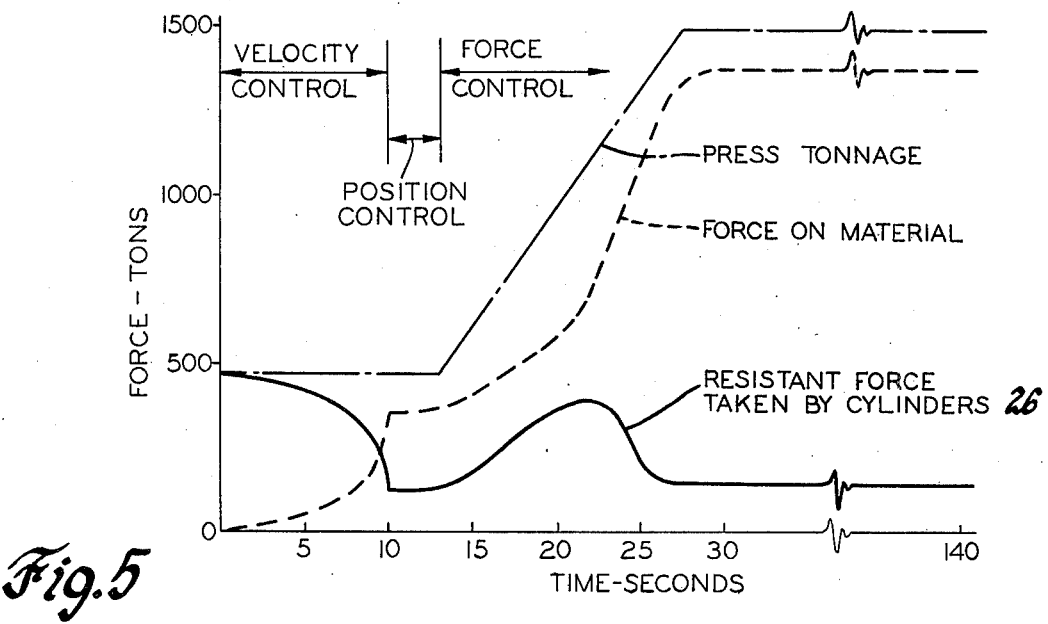
FIG. 5 is a force versus time diagram of a molding press and the force on the molding compound typical of that which may be achieved by practice of the invention.

FIG. 5 illustrates the force versus time during the molding operation. The press tonnage which is crudely programmable by traditional press control means varies according to the upper broken line whereas the force on the molding compound is represented by dashed lines of lower value than the press tonnage. Those differences in force are taken up by the resistant force supplied by the cylinders 26 which force is shown by a solid line. During the 10 second period of mold closing, described relative to FIG. 4, the resistant force of the cylinders gradually decreases from a value equal to the press tonnage to a somewhat lower value allowing the material to be subjected to a gradually increasing force as resulting from the velocity control. After the 10 second period, a dwell period or position control extends, for say 3 or 4 seconds, to allow curing of the material as a result of heat supplied to the material from the heated mold. Then to complete the material curing, the press connage is increased according to conventional press control practice while the resistant force supplied by the cylinders varies according to an empirically derived program to obtain a net force on the molds of a predetermined value which may be constant but usually varies with time according to a schedule. The pressure transducers associated with each group of cylinders send signals to the controller 24 which converts these signals to force, calculates the total net force on the molds and compares this to the program and generates signals for servo valves 29 to increase or decrease pressure. Simultaneously the LVDT's 20 are sending signals to the controller indicating positions of the four corners of the ram. The controller integrates position and force signals and generates control signals to the servo valves which will maintain parallelism and force control.

During the curing or force control mode of operation, it is desirable to have a large force on the molding compound so that in spite of local imbalance in curing rate, which tends to pull some portions of the mold material away from the mold surface, the mold is firmly pressed against the molding compound to transfer heat to the compound and thereby properly cure all portions of the molded article. On the other hand, while the molding compound in the early stages of the curing mode is relatively soft, excessive force on the material may cause it to squirt out of the mold. The maximum allowable force is dependent upon the stage of cure of the material at a given point of time. Thus for a given mold design, the desired force on the material is empirically programmed into the microprocessor 24 so that the force supplied by the cylinders may be varied in one second increments to subtract from the force applied by the increasing press tonnage. Thus, if desired, the dwell period may be extended even though the press tonnage has begun to increase and thereafter the force on the material may be allowed to increase at whatever rate is appropriate to the particular part being molded. Although not depicted in the diagram in FIG. 5, the press is opened at the end of the curing cycle by the force of the cylinders 26, the press force having been relieved. During this opening period, the molds are maintained parallel under control of the controller 24 thereby minimizing mold wear and part damage.

Figure 8:
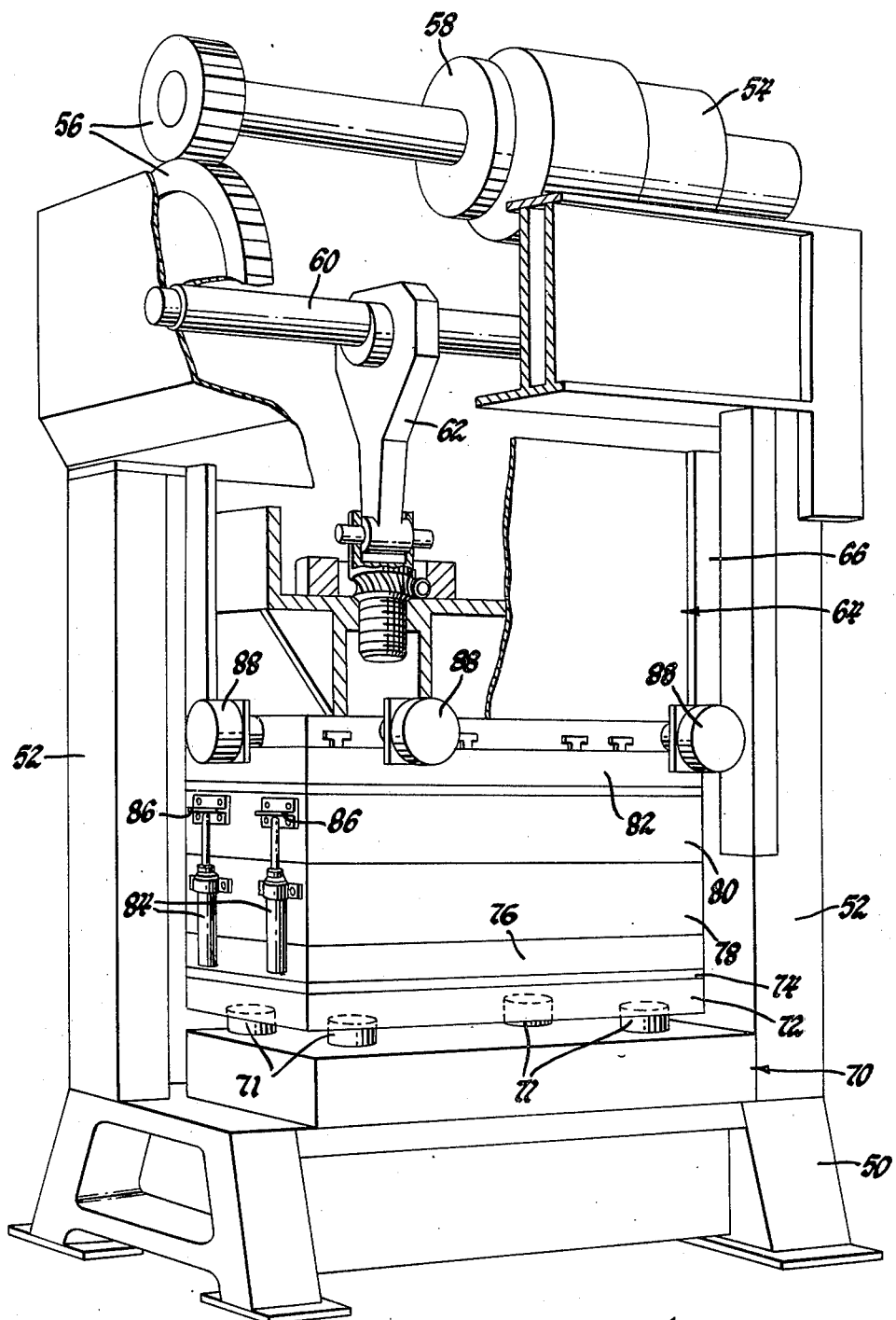
FIG. 8 is a partly broken away perspective view of a mechanical press converted for use with the subject invention.

The method has been described above as applied to a conventional hydraulic compression molding press. The ensuing description, however, is applied to a mechanical steel stamping press modified to operate as a hydraulic compression molding press. FIG. 8 shows a mechanical press comprising a base 50, side frames 52 supporting a motor 54 which drives gears 56 through a clutch-brake assembly 58. The gears drive a crankshaft 60 which controls a connecting rod 62 having its lower end coupled to a ram 64. The ram is guided in gibs 66 at each corner. Although the mechanical press as thus far described is conventional, the press is modified for operation as a molding press by adding a hydraulic bolster 70 on the base 50 which comprises a set of at least four pressure cylinders 71, one near each corner of the mold which they support. A larger number of pressure cylinders may be used for improved force distribution. A pressure plate 72 is supported by the pressure cylinders, an insulation layer 74 is mounted above that, and a heat plate 76 is located above the insulation. The lower mold 78 half is carried by the heat plate and the upper half mold 80 is attached to the press ram 64 via a shoe 82. As described previously, four LVDT's 84, one near each corner of the molds, are used to gauge the amount of mold separation. In this example, however, the LVDT's are secured directly to the sides of the lower mold with cooperating abutment plates 86 attached directly to the upper mold for separable engagement with the LVDT's. The location of each LVDT 84 corresponds to the location of a respective pressure cylinder, or group thereof even though they are longitudinally separated. Three clamp cylinders 88 fixed to brackets, not shown, on the side frames releaseably engage the ram 64 at its bottom dead center position. Two of the clamps 88 are located on the side face of the ram and one clamp is at an end of the ram so that the ram is pushed diagonally against the gib which is in the corner of the press opposite the cylinders whereby the ram is positioned stably and repeatably in the same location irrespective of tolerances between the ram and gibs.

In operation, the press ram is normally positioned at its raised position and a charge of molding compound is added to the mold cavity. Then the ram is lowered to its bottom dead center position and the clutch brake 58 is energized to its braking mode to retain the ram in that lower position. The clamp cylinders 88 are then pressurized to firmly position the ram within the press. During the final stages of the lowering of the ram, some relatively minor force may be applied to the molding compound in the mold, however, the molds will be separated by about 1 inch from a final closed position. The primary press force is applied by the hydraulic cylinders 71 beneath the lower mold to controllably close the molds, the ram 64 serving only as a stationary reaction member. The control system for the cylinders is like that of FIGS. 1-7, i.e., LVDT's 84 are connected to an electrical controller which individually controls the hydraulic cylinders 71 to maintain mold parallelism and programmed closing velocity and force transducers associated with each cylinder 71 provides inputs to the control which enable programmable force control during the cure stage. By using double action cylinders 71, a controlled mold opening force is provided for parallel mold separation. It will thus be apparent that the method of this invention permits the conversion of mechanical presses to hydraulic compression molding presses with programmed velocity and force control.

It will be seen that by the method of this invention fiber impregnated molding compound is moldable in an improved manner using programmed velocity and force control as well as parallelism control on both hydraulic compression molding presses and mechanical presses.

The embodiments of the invention in which an exclusive property or privilege is claimed are defined as follows:

1. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article and a cure mode wherein high force is applied by the press on the molds while the molding compound cures, comprising the steps of measuring the position of the mold halves in relation to each other in the direction of mold closing movement at a plurality of monitoring locations spaced in relation to the direction of mold closing movement, during the closing mode applying a mold closing press force and controlling the net force on the mold by applying individual controllable forces to the press at locations substantially at the said monitoring locations while controlling each of said individual forces in response to the measurements of the relative position of the mold halves so as to maintain a predetermined tilt relationship of the mold halves and controlling the total closing force to effect predetermined mold closing velocity values, and during the subsequent cure mode, maintaining the individual forces at values to obtain the net press force on the mold at a predetermined value while curing the molding compound, and maintaining parallelism of the mold halves by controlling the individual forces in response to the measured mold position to correct any deviations from a parallel mold condition.

2. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article and a cure mode wherein high force is applied by the press on the mold while the molding compound cures, comprising the steps of measuring the position of one mold half relative to the other mold half at a plurality of spaced monitoring locations to determine mold spacing and parallel relationship, variably controlling press forces on the mold by applying individual controllable forces to the press at locations corresponding to the said monitoring locations, operating the press in the mold closing mode and, in response to the measured mold position, controlling the individual forces to control the mold closing velocity to a variable value scheduled to flow the molding compound within the mold cavity in an optimum manner, operating the press in the cure mode and controlling the individual forces at values to maintain the press force on the mold at a scheduled time variable value during curing of the molding compound, and maintaining the parallelism of the mold halves in each said mode by controlling the individual forces in response to the measured mold position to correct any deviations from a parallel mold condition.

3. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article, a dwell mode to allow partial curing of the molding compound under low press force, and a cure mode wherein high force is applied by the press on the mold while the molding compound cures, comprising the steps of measuring the position of one mold half relative to the other mold half at a plurality of spaced monitoring locations to determine mold spacing and parallel relationship, variably controlling press forces on the mold by applying individual controllable forces to the press at locations corresponding to the said monitoring locations, operating the press in the mold closing mode and, in response to the measured mold position, controlling the individual forces to control the mold closing velocity to a variable value scheduled to flow the molding compound within the mold cavity in an optimum manner, then in the dwell mode holding the mold position at the desired part thickness, measuring the individual controllable forces, subsequently operating the press in the cure mode and controlling the measured individual forces at values to maintain the press force on the mold at a scheduled time variable value during curing of the molding compound, and maintaining the parallelism of the mold halves in each said mode by controlling the individual forces in response to the measured mold position to correct any deviations from a parallel mold condition.

4. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article, a cure mode wherein high force is applied by the press on the mold while the molding compound cures, and a mold opening mode to allow part removal, comprising the steps of measuring the position of one mold half relative to the other mold half at a plurality of spaced monitoring locations to determine mold spacing and parallel relationship, variably controlling press forces on the mold by applying individual controllable forces to the press at locations corresponding to the said monitoring locations, operating the press in the mold closing mode and, in response to the measured mold position, controlling the individual forces to control the mold closing velocity to a variable value scheduled to flow the molding compound within the mold cavity in an optimum manner, measuring the individual controllable forces, operating the press in the cure mode and controlling the measured individual forces at values to maintain the press force on the mold at a scheduled time variable value during curing of the molding compound, opening the mold under control of the individual forces, and maintaining the parallelism of the mold halves in each said mode by controlling the individual forces in response to the measured mold position to correct any deviations from a parallel mold condition.

5. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article and a cure mode wherein high force is applied by the press on the mold while the molding compound cures, comprising the steps of measuring the position of one mold half relative to the other mold half at a plurality of spaced monitoring locations to determine mold spacing and parallel relationship, applying a main press force on the mold in the direction of mold closing and variably controlling the magnitude and distribution of press forces on the mold by applying individual controllable forces to the press in the direction of mold opening to resist the main press force at locations corresponding to the said monitoring locations, operating the press in the mold closing mode and, in response to the measured mold position, controlling the individual forces to control the mold closing velocity to a variable value scheduled to flow the molding compound within the mold cavity in an optimum manner, operating the press in the cure mode and controlling the individual forces at values to maintain the press force on the mold at a scheduled time variable value during curing of the molding compound, and maintaining the parallelism of the mold halves in each said mode by controlling the individual forces in response to the measured mold position to correct any deviations from a parallel mold condition.

6. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article and a cure mode wherein high force is applied by the press on the mold while the molding compound cures, comprising the steps of measuring the position of one mold half relative to the other mold half at a plurality of spaced monitoring locations to determine mold spacing and parallel relationship, applying a main press force on the mold in the direction of mold closing and variably controlling the magnitude and distribution of press forces on the mold by applying individual controllable forces to the press in the direction of mold opening to resist the main press force at locations corresponding to the said monitoring locations, operating the press in the mold closing mode and, in response to the measured mold position, controlling the individual forces to control the mold closing velocity to a variable value scheduled to flow the molding compound within the mold cavity in an optimum manner, measuring the individual controllable forces, operating the press in the cure mode and controlling the measured individual forces at values to maintain the press force on the mold at a scheduled time variable value during curing of the molding compound, then relieving the main press force on the mold and applying the individual forces to controllably open the mold, and maintaining the parallelism of the mold halves in each said mode by controlling the individual forces in response to the measured mold position to correct any deviations from a parallel mold condition.

7. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article and a cure mode wherein high force is applied by the press on the mold while the molding compound cures, comprising the steps of measuring the position of one mold half relative to the other mold half at a plurality of spaced monitoring locations to determine mold spacing and parallel relationship, applying individual controllable forces to the press at locations corresponding to the said monitoring locations, the sum of the individual forces comprising a variably controlled press force on the molds, operating the press in the mold closing mode and, in response to the measured mold position, varying the press force to control the mold closing velocity to a variable value scheduled to flow the molding compound within the mold cavity in an optimum manner, operating the press in the cure mode and maintaining the press force on the mold at a scheduled time variable value during curing of the molding compound, and maintaining the parallelism of the mold halves in each said mode by controlling the individual forces in response to the measured mold position to correct any deviations from a parallel mold condition.

8. The method of molding a mass of molding compound in a press having spaced apart mold halves defining a mold cavity containing the molding compound wherein the press successively operates in a mold closing mode to effect movement of the molding compound into all areas of the mold cavity to define the shape of the desired article and a cure mode wherein high force is applied by the press on the mold while the molding compound cures, comprising the steps of measuring the position of one mold half relative to the other mold half at a plurality of spaced monitoring locations to determine mold spacing and parallel relationship, applying individual controllable forces to the press at locations corresponding to the said monitoring locations, the sum of the individual forces comprising a variably controlled press force on the molds, operating the press in the mold closing mode and, in response to the measured mold position, varying the press force to control the mold closing velocity to a variable value scheduled to flow the molding compound within the mold cavity in an optimum manner, measuring the individual controllable forces, operating the press in the cure mode and maintaining the press force on the mold at a scheduled time variable value during curing of the molding compound by controlling the measured individual forces, then controllably opening the mold by applying the individual forces in a mold opening direction, and maintaining the parallelism of the mold halves in each said mode by controlling the individual forces in response to the measured mold position to correct any deviations from a parallel mold condition.

* * * * *